Feb. 23, 1971 MASAYUKI FUKATA 3,566,270

PROGRAM-SIGNAL BROADCAST SYSTEM TRANSMISSIBLE OF A CONTROL SIGNAL BY THE USE OF INTERMITTENT TRANSMITTER CONTROL FOR FREQUENCY FILTERING

Filed Jan. 4, 1968

4 Sheets-Sheet 1

INVENTOR.
Masayuki Fukata
BY
Robert m. Dunning ATTY.

INVENTOR.
Masayuki Fukata
BY
Robert M. Dunning
ATTY.

Feb. 23, 1971 MASAYUKI FUKATA 3,566,270

PROGRAM-SIGNAL BROADCAST SYSTEM TRANSMISSIBLE OF A CONTROL SIGNAL BY THE USE OF INTERMITTENT TRANSMITTER CONTROL FOR FREQUENCY FILTERING

Filed Jan. 4, 1968 4 Sheets-Sheet 3

INVENTOR.
Masayuki Fukata
BY
Waddon Dunning
ATTY.

INVENTOR.
Masayuki Fukata
BY
Robert M. Dunning
ATTY.

United States Patent Office
3,566,270
Patented Feb. 23, 1971

3,566,270

PROGRAM-SIGNAL BROADCAST SYSTEM TRANSMISSIBLE OF A CONTROL SIGNAL BY THE USE OF INTERMITTENT TRANSMITTER CONTROL FOR FREQUENCY FILTERING

Masayuki Fukata, 94 Shimorenjaku, Mitaka-shi, Tokyo, Japan

Filed Jan. 4, 1968, Ser. No. 701,031
Claims priority, application Japan, Oct. 16, 1967, 42/66,088
Int. Cl. H04b *3/04;* C08b *21/00*
U.S. Cl. 325—64 10 Claims

ABSTRACT OF THE DISCLOSURE

A system for controlling, from the sending side, the receiving side in a broadcast system using a control signal, where a false signal similar, with respect to frequency and signal-configuration, to the regular control signal is detected from the broadcast signals before the receiving side is spuriously triggered by the false signals and elimination filter or filters is/are inserted in the path of the broadcast signals during only a predetermined time to eliminate the same frequency components as the control signal, whereby the control signal can be transmitted with no chance of spurious triggering.

This invention relates to a system for controlling, from the sending side, the receiving side in a broadcast system, and more particularly to (1) an emergency broadcast system for transmitting emergency information, such as information of a natural disaster etc., from the broadcast station to the receivers, (2) a recorder-control broadcast system for causing recorders of the receivers, such as tape-recorders, to record the broadcast information in accordance with the control of the broadcast station, or (3) a broadcast system for a control signal transmitted to control the switch operation of each of various kinds of apparatus at the receiving side.

In the conventional system of the type (e.g.; the emergency broadcast system), the emergency control signal is sent out of the sending side, such as the broadcast station, before the broadcast of an emergency information. In this case, if a broadcast program is being sent out, the emergency control signal is sent out together with the broadcast program. However, if the broadcast program is interrupted, only the emergency control signal is sent out. The emergency control signal is generally a continuous or intermittent wave or waves each having a predetermined frequency, or it may be a frequency wobbled wave or waves in consideration of discordance among frequency-characteristics of respective receiving-section circuits at the receivers. If there are many kinds of the emergency control signals to be transmitted, plural signal-waves are employed instead of a single wave. Amplitude-modulation or frequency-modulation may be employed as the modulation system of this case. The emergency information will be sent out after sending the above-mentioned emergency control signal.

On the other hand, the receiver side each providing with a receiving set, such as a radio receiving set or a television set, is established in the stand-by condition for receiving the emergency control signal. In other words, the video pattern and/or the audio output of the receiving set are/is not seen or heard because of the inactive state of the video circuit and/or the audio circuit. The receiving set is designed so that if an emergency control signal is transmitted from the sending side, the receiving-and-selection circuit of the emergency control signal provided at a receiver receives and selects only the transmitted emergency control signal and then actuates the video circuit and/or the audio circuit. Accordingly, if a predetermined emergency control signal is received at a receiver, the video circuit and/or the audio circuit of the receiver is switched from the inactive state to the active state in which the emergency information following after the emergency control signal can be received at the receiver in the receiver's eyes and/or ears.

In this system, it is essential that in consideration of the nature of the emergency information, the emergency information to be transmitted is reliably transmitted to each of the receivers in 100% efficiency and, in case of no transmission of the emergency control signal, the receiving-and-selection circuit does not at all carry out the spurious triggering in which it detects in error a like signal as the emergency control signal (hereinafter called as "false signal") as the regular emergency control signal. To meet these requirements, the receiving-and-selection circuit of the emergency control signal in the conventional system is provided with a narrow band-pass filter or filters or, for an intermittent signal or signals, further a complex gate circuit designed in consideration of the duration, the intermittent period and the predetermined number of pulses of the intermittent signal waves. However, the more complex the gate circuit becomes to avoid the spurious triggering, the less the reliability of the detection operation in receiving a regular emergency control signal becomes.

To avoid the spurious triggering, is further proposed a technique in which the emergency control signal is formed into the configuration which could not occur in actual broadcast programs. However, even though the configuration of the emergency control signal is established in consideration of all of ever existed matters, music having new rhythms and melodies would be composable infinitely. Accordingly, even if such requirement that the emergency control signal is formed into the configuration which could not occur in actual broadcast programs is satisfied, and even if such defects as complex formation and high price of the receiving-and-selection circuit are neglected, it is impossible that the emergency control signal is stably and reliably transmitted to each of the receivers so as to make it receive the emergency information only.

Moreover, since the noise in the transmission medium must be under consideration in actual systems, the above-mentioned unstableness will further increase.

An object of this invention is to provide a broadcast system for a control system capable of completely eliminating the possibility of the spurious triggering while the receiving-and-selection circuit of the emergency control signal may be designed in simple formation.

Another object of this invention is to provide a broadcast system capable of, by the transmission of a control signal without spurious triggering, switching the receiving condition of the receiving side from the stand-by state to the receivable state for a broadcast information signal which is transmitted after the sending-out of the control signal.

Further object of this invention is to provide a broadcast system capable of, by transmission of a control signal without spurious triggering, controlling a device provided at the receiving side for receiving the control signal only.

According to this invention, there is proposed a broadcast system for transmitting a control signal from the sending side to the receiving side, comprising elimination means for eliminating the same frequency components as the control signal from broadcast signals being transmitted through a transmission medium of the broadcast system, detection means for detecting from the broadcast signals a false signal similar to the control signal within a shorter time than the predetermined time length of the control signal, and control means for inserting during only a predetermined time the elimination means into the path of the broadcast signals when the detection means detects the false signal.

In an example of this invention, the receiving side is provided with a detector for the control signal to switch the receiving condition of the receiving side from stand-by state to the receivable state for a broadcast information signal which is transmitted after the sending-out of the control signal.

In another example of this invention, the receiving side is provided with a detector for the control signal only to control a device of the receiving side irrespectively of other broadcast information signals.

The principle of this invention will be better understood from the following more detailed discussion taken in conjunction with the accompanying drawings, in which the same or equivalent parts are designated by the same reference numerals, characters, and symbols as to one another, and in which:

FIGS. 3A, 3B and 3C are block-diagrams for illustrating an embodiment of this invention, in which FIG. 3A shows the sending side, FIG. 3B a general receiving side, and FIG. 3C a monitor receiving side;

Figure 1:
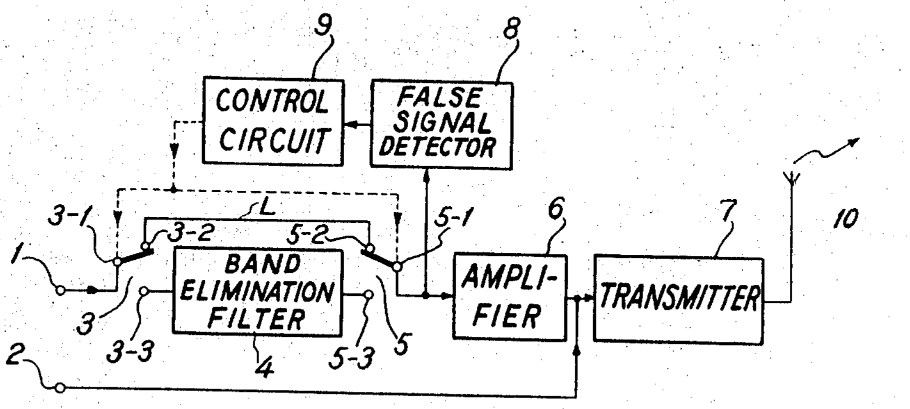
FIGS. 1 and 2 are block-diagrams for illustrating respectively embodiments of this invention.

It is the principle of this invention that in a point of view in which the cause of spurious triggering is included in the broadcast programs tarnsmitted from the sending side, "the state just before the possible spurious triggering" is detected by a detector and then employed to eliminate the cause of spurious triggering. Accordingly, the system of this invention is provided with detection means for detecting "the state just before the possible spurious triggering" and elimination means for eliminating the cause of spurious triggering from the broadcast programs. In this case, the detection means has to have the function for detecting without error "the state just before the possible spurious triggering" if there is the possibility of spurious triggering. In this connection, since the emergency control signal lasts generally over a time of several seconds, "the state just before the possible spurious triggering" can be detected without much difficulty. By way of examples, it is now assumed that the emergency control signal is composed of a predetermined intermittent number of a signal wave and the predetermined intermittent number is equal to five. A state, where three or four intermittent numbers of a signal wave having the same frequency and the same intermittent period as the regular emergency control signal is received, is detected in this case as "the state just before the possible spurious triggering." The eliminating means has to eliminate without error the cause of spurious triggering from the broadcast program and moreover to stably send out the regular emergency control signal without erroneous check.

In consideration of the above-requirements, the elimination means comprises a filter having an elimination-band eliminating the frequency-band inclusive of substantially all the selection frequencies of the receivers, and switch means for inserting the filter into the path of the broadcast programs during a predetermined time. The regular emergency control signal is combined with the broadcast program after the elimination means or before the elimination means if the elimination means is locked into its inoperable condition at the sending-out time of the regular emergency control signal. Under the above-mentioned condition, the regular emergency control signal can be reliably transmitted to each of the receivers.

The above-mentioned principle can be applied to not only the broadcast system for the emergency information but also the recorder-control broadcast system. In this recorder-control broadcast system, the broadcast station sends out a trigger control signal to start a recorder, such as a tape-recorder, provided at a receiver and operable in response to the receiving of the trigger control signal by the receiver. The broadcast information transmitted after the trigger control signal is received in the recorder and can be reproduced at any time thereafter. Since the sending-and-receiving technique of this system is similar to the above-mentioned case of the broadcast system for the emergency information, the spurious triggering in this system can be eliminated in the similar manner to the above case. The recorder is a tape-recorder in case of voice signal and a video tape-recorder or a facsimile receiver in case of video signal.

The principle of this invention can be applied also to the broadcast system for the control signal transmitted to switch the operation state of each of various kinds of apparatus at the receiving side. An example of the apparatus to be controlled is an electro-mechanically correctable clock which is regulated in response to the transmitted time signals. In this case, prior pulses transmitted previously to a correct time pulse can be deemed as the control signal, and the correct time pulse can be deemed as the broadcast information.

An embodiment of this invention applied to the emergency broadcast system will be described below with reference to FIG. 1. This embodiment comprises an input terminal 1 to apply the broadcast program signals, a terminal 2 to apply the emergency control signal, switches 3 and 5, a band-elimination filter 4 to eliminate a frequency or frequencies of the emergency control signal, a unidirectional amplifier 6, a transmitter 7 including a modulator, a false signal detector 8 which detects a signal similar to the regular emergency control signal (i.e.; "the state just before the possible spurious triggering"), a control circuit 9 to switch the switches 3 and 5 in response to the output of the false signal detector 8, and an antenna 10.

In the normal condition of this embodiment, the switches 3 and 5 are restored as shown in FIG. 1 so that contacts 3–1 and 3–2 and contacts 5–1 and 5–2 are respectively connected. Accordingly, the broadcast program signals from the terminal 1 is passed through a line L and the amplifier 6 and then sent out from the transmitter 7 and the antenna 10, on the air, to a number of receivers (not shown). The false signal detector 8 detects "the state just before the possible spurious triggering." By way of example, the regular emergency control signal is formed by a plurality of sequence signals of different frequency, the false signal detector 8 is provided with a plurality of band-pass filters each corresponding to the sequence signals and determines as "the state just before the possible spurious triggering" if the sequence signals last over a predetermined time. As an actual example, if the regular emergency control signal is formed by two sequence signals $f_1$ and $f_2$ lasting over five seconds, the false signal detector 8 determines as "the state just before the possible spurious triggering" if the sequence signals $f_1$ and $f_2$ last over three or four seconds. In another example, if the regular emergency control signal is formed by five intermittent pulses of a signal wave, the false signal detector 8 determines as "the state just before the possible spurious triggering" if three or four of the intermittent pulses are detected in it. The detected output of the false signal detector 8 is applied to the control circuit 9 and employed to switch the switches 3 and 5 during a predetermined time ($\tau$) only. Accordingly, if the false signal detector 8 produces its output, the broadcast program signals pass through the terminal 1, the contact 3–1, the contact 3–3, the band-elimination filter 4, the contact 5–3, the contact 5–1 and the amplifier 6 and is applied to the transmitter 7. Therefore, signals having the possibility of the spurious triggering cannot be transmitted on the air from the antenna 10. In this embodiment, it is desirable that the filter provided in the false signal detector 8 has a relatively wide pass-band so as to cover the staggered frequency characteristics of substantially all the selection filters which would be provided at a number of receivers. However, it may be suitable to a special case that the false signal detector 8 has a plurality of narrow pass-band filters each of which has a center frequency corresponding to a desired frequency within the staggered frequency characteristics.

Since the regular emergency control signal applied from the terminal 2 is combined with the broadcast program signals after the unidirectional amplifier 6, there is no chance where the regular emergency control signal is checked by the band-elimination filter 4 and no chance where the control circuit 9 carries out its control operation in response to this regular emergency control signal. Accordingly, the possibility of the spurious triggering can be completely eliminated at each of the receivers which receive the broadcast information transmitted from the embodiment of FIG. 1. Moreover, the regular emergency control signal is exactly received at each of the receivers, so that the emergency information broadcast after the emergency control signal is exactly received also.

Figure 2:
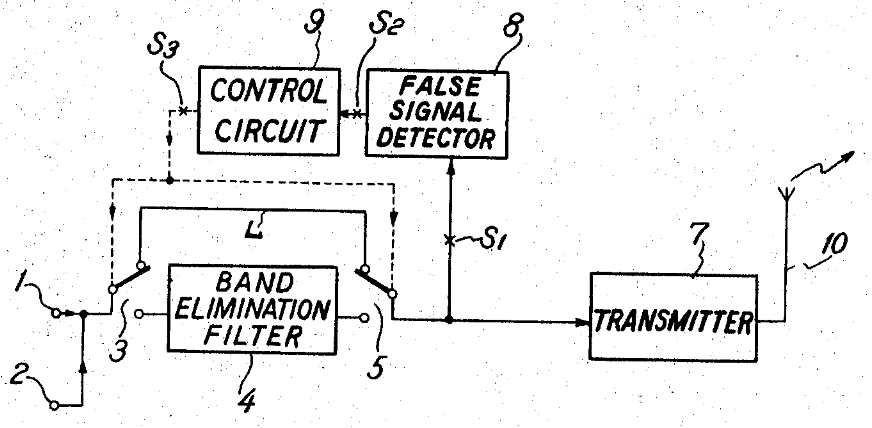

FIG. 2 shows another embodiment of this invention in which the emergency control signal is combined with the broadcast information before the band-elimination filter 4. This embodiment is designed from a point of view in which the emergency control signal is sent out only at a time necessary to broadcast the emergency information, and in which if the false signal detector 8 and the control circuit 9 or the switching operations of the switches 3 and 5 are locked into their inoperable conditions, the necessary requirement can be met in this arrangement. Such lock may be performed in any manner. By way of examples, a switch may be inserted at a point $S_1$, $S_2$ or $S_3$ to cut off it at the necessary time, or the switches 3 and 5 may be locked at the necessary time.

Figure 3A:
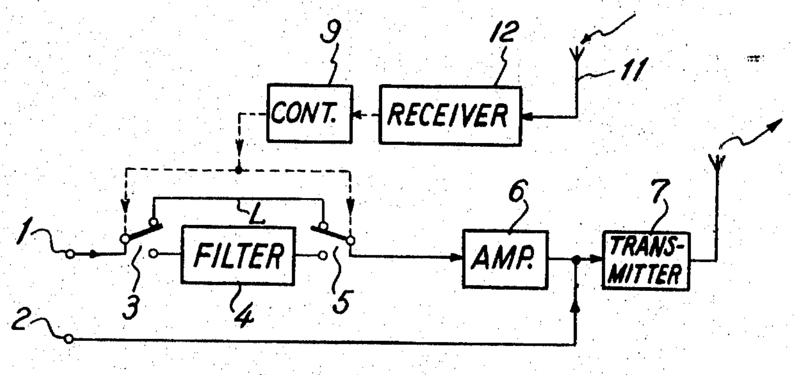
Figure 3B:
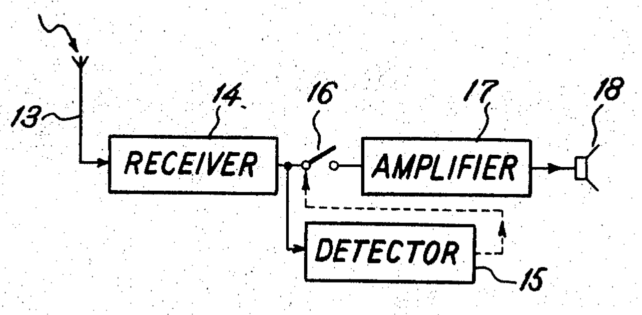
Figure 3C:
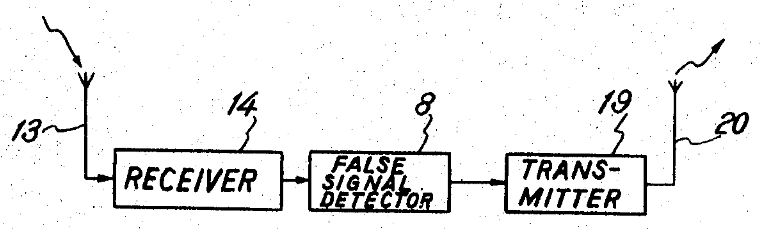

Another embodiment of this invention will be described with reference to FIGS. 3A, 3B and 3C, which show respectively a sending side in FIG. 3A, a general receiver in FIG. 3B, and a monitor receiver in FIG. 3C. The monitor receiver is provided to detect "the state just before the possible spurious triggering" and to communicate the detected result to the sending side. The sending side of this embodiment adopts the combined system similar to that of FIG. 1, but the combined system similar to that of FIG. 2 may be of course employed. At the sending side of this embodiment, an antenna 11 and a receiver 12 are provided instead of the false signal detector 8. At the general receiver, there is provided with an antenna 13, a receiver 14 coupled with the antenna 13, an emergency-control-signal detector 15, a switch 16 switched by the output of the detector 15, an audio circuit 17 and a speaker 18. In the stand-by condition, only the receiver 14 and the detector 15 are actuated. If an emergency control signal is detected by the detector 15, the switch 16 is switched by the output of the detector 15 so as to connect the receiver 14 with the audio circuit 17. Accordingly, the emergency information broadcast after the emergency control signal can be heard through the speaker 18. In the monitor receiver, there are provided with the antenna 13, the receiver 14, the false signal detector 8, and a transmitter 19 to transmit the detected output of the false signal detector 8 from an antenna 20 to the sending side. Since the detected result transmitted from the monitor receiver is received by the antenna 11 and the receiver 12 of the sending side and applied to the control circuit 9, the similar operation to those of FIGS. 1 and 2 can be carried out in this embodiment.

In this embodiment, it is necessary to provide a pair of transmitters (19 and 20) and receivers (11 and 12) systems. However, in a rare case where receivers in a limited area or areas are attacked by the spurious triggering while other receivers in other areas are not at all attacked by the spurious triggering, this embodiment would be utilized to reduce the area of the spurious triggering. Above-mentioned local colors as to the spurious triggering occur in accordance with the special condition of this limited area, such as wide fluctuation range of the temperature or the source voltage, and high level of the noise or the interference signals. If such special condition exists in the limited area, the spurious triggering is liable to occur in combination with false signals included in the broadcast program signals. Accordingly, if the cause of the spurious triggering is completely eliminated from the broadcast program signals, the spurious triggering at the limited area would be reduced effectively. At the monitor receiver, the audio circuitry (16, 17 and 18) may be of course provided similarly to the general receiver.

In this embodiment, the detected result of the false signal detector 8 is transmitted, through the transmitter means (19 and 20) and the receiver means (11 and 12). However, it is not essential that the detected result is transmitted through radio transmission medium. In other words, the detected results may be transmitted through wire-transmission medium to the sending side.

Figure 4:
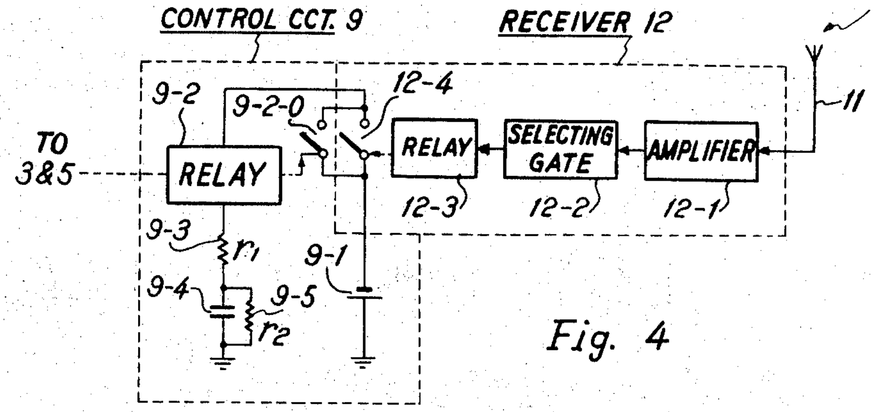
FIG. 4 is a block-diagram for describing the operation of a control circuit in the system of this invention.

With reference to FIG. 4, an example of means for switching the switches 3 and 5 during a predetermined time will now be described. This is an example applied to the arrangement shown in FIG. 3A. In this example, the receiver 12 comprises a receiving amplifier 12–1, a selecting gate circuit 12–2 and a relay circuit 12–3. The selecting gate circuit 12–2 is designed for an appropriate arrangement so as to be suitable to the configuration and modulation system of the control signal transmitted from the monitor receiver. The control circuit 9 comprises a relay circuit 9–2, a DC current source 9–1, resistors 9–3 and 9–5 series-connected to the relay circuit 9–2, and a capacitor 9–4 connected in parallel with the resistor 9–5.

In this example, if a control signal is received by the receiver 12 and therefore the relay circuit 12–3 operates, the contact 12–4 is closed so that a DC voltage is applied from the DC source 9–1, through the closed contact 12–4, to the relay circuit 9–2. The charging current of the capacitor 9–4 flows through the loop circuit which is composed of the DC source 9–1, the contact 12–4, the relay circuit 9–2, the resistor 9–3 and a capacitor 9–4. In this case, the initial loop current is substantially determined by a resistance ($r_1$) of the resistor 9–3 and internal resistances of the DC source and the relay circuit 9–2. Accordingly, if the resistance $r_1$ is an appropriate value, the relay circuit 9–2 can be operated by the initial loop current during only the charging time ($\tau$) of the capacitor 9–4 and then restored after the time ($\tau$). The time constant ($\tau$) is substantially equal to a value $r_1c_1$ (e.g.; a few seconds) which is determined by the resistance $r_1$ of the resistor 9–3 and the capacitance $c_1$ of the capacitor 9–4. The resistor 9–5 has a relatively large resistance. As the result of the above-operation, the relay circuit 9–2 switches the switches 3 and 5 during the time ($\tau$) only. At the same time, a contact 9–2–0 is closed in response to the set operation of the relay circuit 9–2. Accordingly, even if the contact 12–4 is restored in response to the termination of the control signal transmitted from the monitor receiver, the loop current flows through the closed contact 9–2–0 until restoration of the relay circuit 9–2. When the relay 9–2 is restored after the time ($\tau$), the switches 3 and 5 are restored; and the contact 9–2–0 is opened so that the loop current is terminated. Since the charged voltage of the capacitor 9–4 is discharged through the resistor 9–5, the following operation can be carried out similarly. If the relay circuit 12–3 has a self-holding means of the contact 12–4, the contact 9–2–0 may be eliminated. The self-hold of this self-hold means shall be resolved manually or automatically thereafter.

In the above-mentioned embodiments, it is assumed for ready understanding that the band-elimination filter 4 has a characteristic eliminating all of the same frequencies as those of the emergency control signal. However, if the emergency control signal is formed by a plurality of signal waves of different frequencies, it is not always essential that all of the frequencies are eliminated since the spurious triggering would not occur unless all of the signal waves are received at the receiving side.

Figure 5:
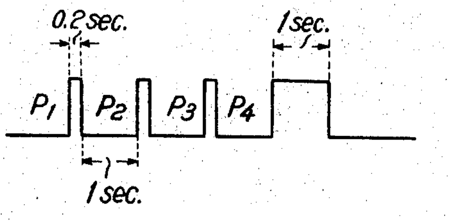
FIG. 5 is a wave form diagram for describing an example of a control signal used in the system of this invention.
Figure 6:
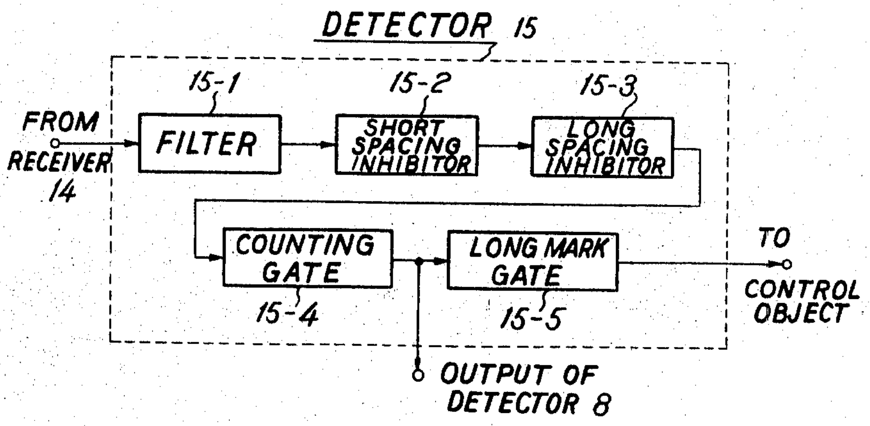
FIG. 6 is a block-diagram for illustrating an example of a detector used to detect the control signal shown in FIG. 5.

FIG. 5 shows an example of the emergency control signal which has four pulses $P_1$, $P_2$, $P_3$ and $P_4$ of 1000 Hz. signal waves by way of example. However, the frequency of the signal wave can be selected at an appropriate frequency to avoid the spurious triggering. Each of three pulses $P_1$, $P_2$ and $P_3$ has a duration of 0.2 second and the last pulse $P_4$ has a duration of one second. The spacings of pulses are equal to one second. The selection gate circuit 15 for receiving and selecting the emergency control signal shown in FIG. 5 can be formed as shown in FIG. 6. This circuit 15 comprises a frequency gate 15–1, a short spacing inhibitor 15–2, a long spacing in inhibitor 15–3, a counting gate 15–4 and a long mark gate 15–5. The frequency gate 15–1 comprises, for example, a band-pass filter to pass only the frequencies near the frequency of the signal wave (e.g.; 1000 Hz.). The short spacing inhibitor 15–2 checks pulses received at a spacing (e.g.; less than 0.6 second) shorter than the normal spacing (one second). The long spacing inhibitor 15–3 checks pulses received at a spacing (e.g.; more than 1.5 seconds) longer than the normal spacing (one second). The counting gate 15–4 is opened at a time when three pulses are successively received from the preceding stage (15–3). The long mark gate 15–5 is opened at a time when a pulse from the preceding stage (15–4) lasts more than a predetermined duration (e.g.; 0.5 second). The output pulse of the gate 15–5 is employed to control any other device.

The emergency control signal of FIG. 5 can be exactly detected by the selection gate circuit 15 shown in FIG. 6. In this arrangement, the output of the counting gate 15–4 can be employed as the output signal of the false signal detector 8. In other words, if the false signal detector 8 is composed of the circuits 15–1, 15–2, 15–3 and 15–4, "the state just before the possible spurious triggering" can be exactly detected in this false detector 8.

Figure 7A:
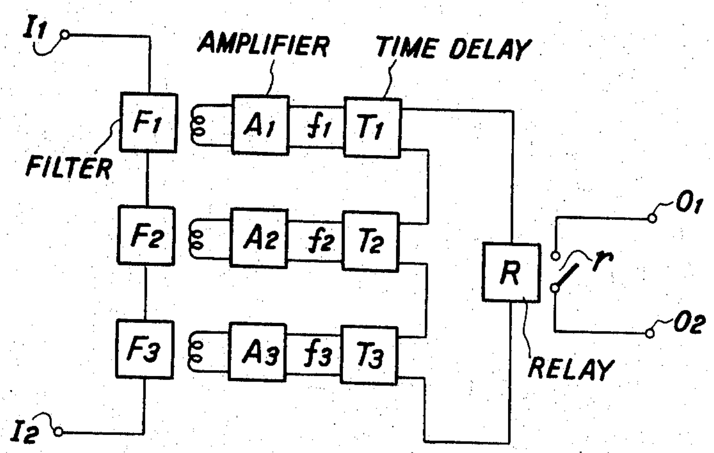
FIGS. 7A and 7B are block-diagrams for illustrating respectively examples of a detector to detect a control signal used in the system of this invention.
Figure 7B:
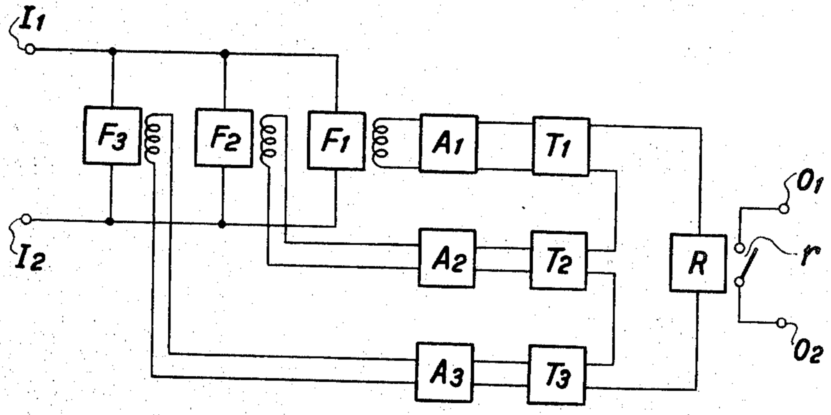

With reference to FIGS. 7A and 7B, examples of the receiving-and-selection circuit 15 for receiving an emergency control signal which is formed by three sequence signal waves having frequencies $f_1$, $f_2$ and $f_3$ respectively. Filters $F_1$, $F_2$ and $F_3$ are band-pass filters respectively selecting the three signal waves $f_1$, $f_2$ and $f_3$. The filters $F_1$, $F_2$ and $F_3$ are connected in series in FIG. 7A and in parallel in FIG. 7B to accept the received signal from input terminals $I_1$ and $I_2$. Outputs of the filters $F_1$, $F_2$ and $F_3$ are applied to amplifiers $A_1$, $A_2$ and $A_3$ respectively and then combined together through time-delay circuits $T_1$, $T_2$ and $T_3$ respectively. The combined output is applied to a relay circuit R. Accordingly, if the relay circuit R is designed so that only when three signal waves $f_1$, $f_2$ and $f_3$ are all received the relay circuit R closes a contact $r$, a control output is obtained from output terminals $O_1$ and $O_2$. The delay time of each of the time delay circuit $T_1$, $T_2$ and $T_3$ is substantially equal to the normal length of the signal waves. If this circuit is employed as the false signal detector 8, the delay time is selected so as to be shorter than the normal length of the signal waves.

Above descriptions relate mainly to broadcast systems using radio frequency or frequencies. However, this invention can be applied to broadcast systems using wire-transmission medium.

As mentioned above in details, it is possible in the system of this invention that an emergency control signal transmitted before the broadcast of "emergency information" are exactly received by each of receivers and that the receiving condition of each of the receivers are switched from "the stand-by state for the emergency control signal" to "the receivable state for the emergency information." Moreover, this operation can be carried out with no chance of spurious triggering. Since the device has the simple formation, large merits in emergency broadcast field will be obtainable in accordance with this invention.

Moreover, this invention can be applied also to the recorder-control broadcast system or other control-broadcast system (e.g.; for electro-mechanical correctable clock).

What I claim is:

1. A program-signal broadcast system transmissible of a control signal through the transmission path of the system from the sending side to the receiving side, comprising:

transmitting means provided at the sending side for transmitting the program-signal and the control signal to a transmission medium, receiving means provided at the receiving side for receiving the control signal from the transmission medium to trigger a controlled object, elimination means provided before said transmitting means at the sending side for eliminating the same frequency components as the control signal from the program-signal, detection means operatively coupled to the transmission path for detecting from the program-signal a false signal similar, with respect to frequency and signal-configuration, to the control signal before said receiving means erroneously receives the false signal as the control signal, and control means coupled to the elimination means and the detection means for inserting for only a predetermined time the elimination means into the transmission path when the detection means detects the false signal.

2. A program broadcast system according to claim 1, in which the receiving means further comprises a receiver employed as said controlled object for receiving the program-signal, and receiver control means coupled to the receiving means and the receiver to trigger the receiver from a muted state to an unmuted condition upon receipt of the control signal.

3. A program broadcast system according to claim 2, in which the system is further provided with a unidirectional amplifier operatively connected between the elimination means and the transmitting means, and the control signal is applied to the transmitting means so as to be combined together with the program-signal after the unidirectional amplifier.

4. A program broadcast system according to claim 2, in which the control signal is combined together with the program-signal before the elimination means, and the system is further provided with means for interrupting the control operation of the control means only when the control signal is to bet transmitted.

5. A broadcast system according to claim 2, in which the detection means is provided at the receiving side of the broadcast system, and further including means at said receiving side for transmitting the detected result of the detection means through said transmission medium to the control means.

6. A program broadcast system according to claim 2, in which the control means comprises two switches provided respectively at before and after the elimination means and employed for inserting the elimination means in the path, a relay circuit for switching-in the two switches when the detection means detects the false signal, and means operatively coupled to the relay circuit for controlling the relay circuit so as to switch-off the two switches after the predetermined time.

7. A program broadcast system according to claim 1, in which the system is further provided with a unidirectional amplifier operatively connected between the elimination means and the transmitting means, and the control signal is applied to the transmitting means so as to be combined together with the program-signal after the unidirectional amplifier.

8. A program broadcast system according to claim 1, in which the control signal is combined together with the program-signal before the elimination means, and the system is further provided with means for interrupting the control operation of the control means only when the control signal is to be transmitted.

9. A broadcast system according to claim 1, in which the detection means is provided at the receiving side of the broadcast system, and further including means at said receiving side for transmitting the detected result of the detection means through said transmission medium to the control means.

10. A program broadcast system according to claim 1, in which the control means comprises two switches provided respectively at before and after the elimination means and employed for inserting the elimination means in the path, a relay circuit for switching-in the two switches when the detection means detects the false signal, and means operatively coupled to the relay circuit for controlling the relay circuit so as to switch-off the two switches after the predetermined time.

References Cited

UNITED STATES PATENTS

| | | | |
|---|---|---|---|
| 3,004,104 | 10/1961 | Hembrooke | 179—2 |
| 3,273,069 | 9/1966 | Craig | 325—364 |
| 3,306,984 | 2/1967 | Leonard | 179—84[VF] |
| 3,391,340 | 7/1968 | Fyler et al. | 325—392 |
| 3,426,153 | 2/1969 | Kitsopoulos | 179—15[APC] |
| 3,436,487 | 4/1968 | Blane | 179—84[VF] |

ROBERT L. GRIFFIN, Primary Examiner

J. A. BRODSKY, Assistant Examiner

U.S. Cl. X.R.

325—65, 183, 187, 395; 179—84; 340—224; 343—227